(12) United States Patent
Sakurai

(10) Patent No.: US 9,596,368 B2
(45) Date of Patent: Mar. 14, 2017

(54) SERVER APPARATUS, METHOD FOR CONTROLLING SERVER APPARATUS, AND STORAGE MEDIUM

(71) Applicant: CANON KABUSHIKI KAISHA, Tokyo (JP)

(72) Inventor: Masakatsu Sakurai, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 60 days.

(21) Appl. No.: 14/613,747

(22) Filed: Feb. 4, 2015

(65) Prior Publication Data

US 2015/0229790 A1    Aug. 13, 2015

(30) Foreign Application Priority Data

Feb. 7, 2014   (JP) .................................. 2014-022026

(51) Int. Cl.
*H04N 1/00*   (2006.01)
*G06F 3/12*   (2006.01)

(52) U.S. Cl.
CPC ....... *H04N 1/00278* (2013.01); *G06F 3/1207* (2013.01); *G06F 3/1222* (2013.01); *G06F 3/1238* (2013.01); *G06F 3/1259* (2013.01); *G06F 3/1288* (2013.01); *H04N 1/00251* (2013.01); *H04N 2201/0084* (2013.01)

(58) Field of Classification Search
None
See application file for complete search history.

(56) References Cited

U.S. PATENT DOCUMENTS

| | | | | |
|---|---|---|---|---|
| 6,654,060 B1* | 11/2003 | Kurosawa | .......... | H04N 5/23203 348/14.04 |
| 2003/0202100 A1* | 10/2003 | Prenn | ..................... | H04N 7/183 348/155 |
| 2008/0193146 A1* | 8/2008 | Yamada | ................. | G03G 15/50 399/79 |

FOREIGN PATENT DOCUMENTS

JP    2008-197152 A    8/2008

* cited by examiner

*Primary Examiner* — Mark T Monk
(74) *Attorney, Agent, or Firm* — Canon USA Inc. IP Division

(57) ABSTRACT

A server apparatus configured to receive a job from an information processing apparatus and generate print data to be printed by a printing apparatus searches for, in response to reception of the job, a camera configured to image a printing apparatus identified by the job. The server apparatus receives an image of the printing apparatus captured by the camera, and distributes the received image to an information processing apparatus identified by the job.

9 Claims, 18 Drawing Sheets

FIG.5

PRINTER MANAGEMENT TABLE

| PRINTER ID | PRINTER NAME | IP ADDRESS |
|---|---|---|
| P_001 | LBP001 | 192.168.1.10 |
| P_002 | LBP002 | 192.168.1.11 |
| P_003 | MFP001 | 192.168.1.12 |
| P_004 | MFP002 | 192.168.1.13 |
| P_005 | LBP003 | 192.168.1.14 |

FIG.6

CAMERA MANAGEMENT TABLE

| CAMERA ID | CAMERA NAME | IP ADDRESS | PAN | TILT | ZOOM |
|---|---|---|---|---|---|
| C_001 | NC001 | 192.168.2.10 | 0 | 30 | 100 |
| C_002 | NC002 | 192.168.2.11 | 0 | 30 | 100 |
| C_003 | NC003 | 192.168.2.12 | 0 | 30 | 100 |

FIG.7

PRINTER-CAMERA CORRESPONDENCE TABLE

| PRINTER ID | CAMERA ID | PAN | TILT | ZOOM |
|---|---|---|---|---|
| P_001 | C_001 | 35 | 30 | 150 |
| P_002 | C_002 | 80 | 35 | 180 |
| P_003 | C_003 | 110 | 40 | 200 |
| P_004 | C_004 | 115 | 40 | 210 |

FIG.8

USER INFORMATION TABLE

| USER ID (801) | USER NAME (802) | FEATURE DATA (803) | MAIL ADDRESS (804) |
|---|---|---|---|
| U_001 | ABC | "0x3f5d20" | abc@mail.com |
| U_002 | DEF | "0x2735fc" | def@mail.com |
| U_003 | GHI | "0x83225a" | ghi@mail.com |
| U_004 | JKL | "0x74962e" | jkl@mail.com |

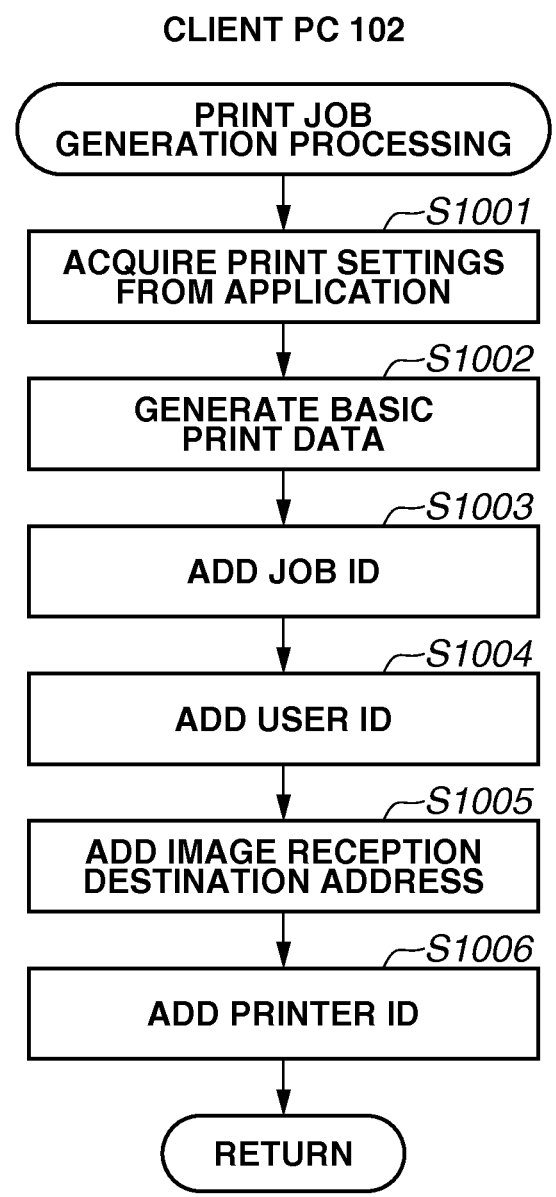

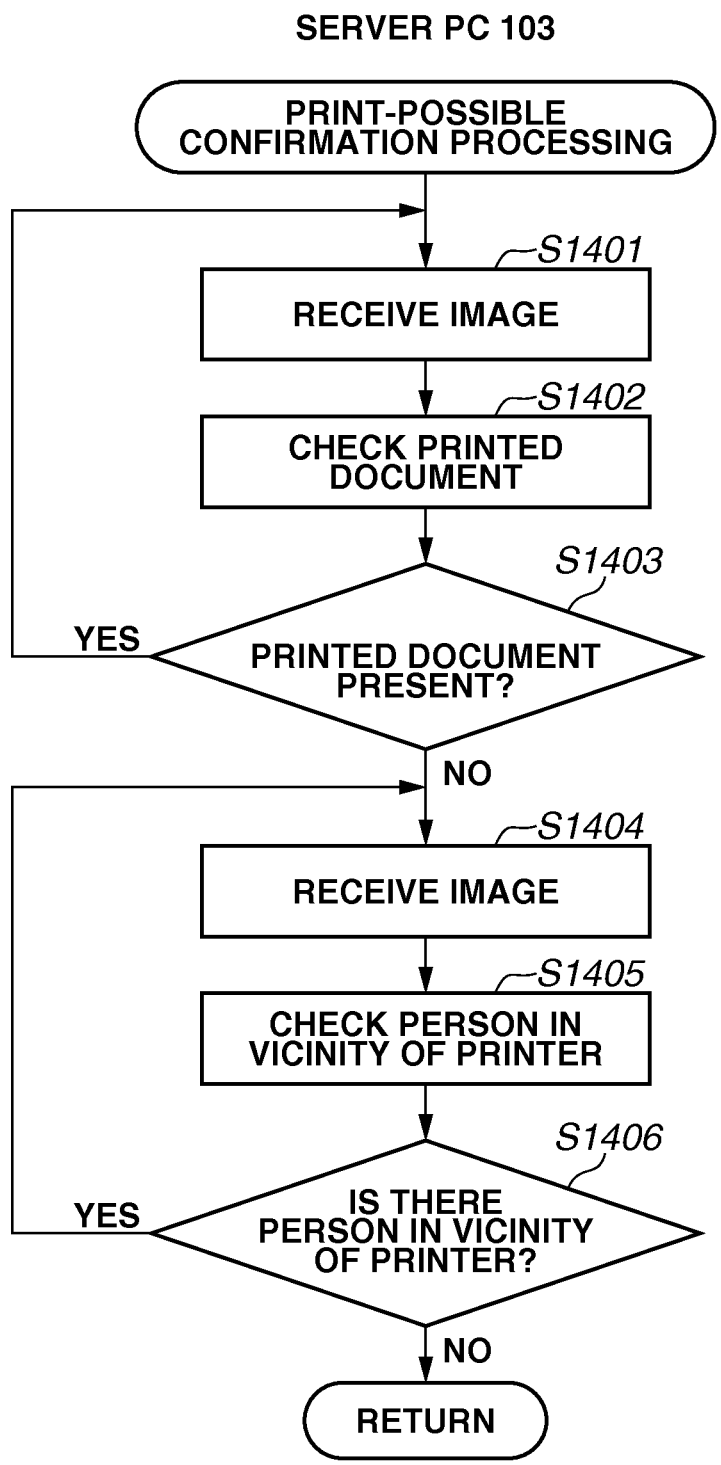

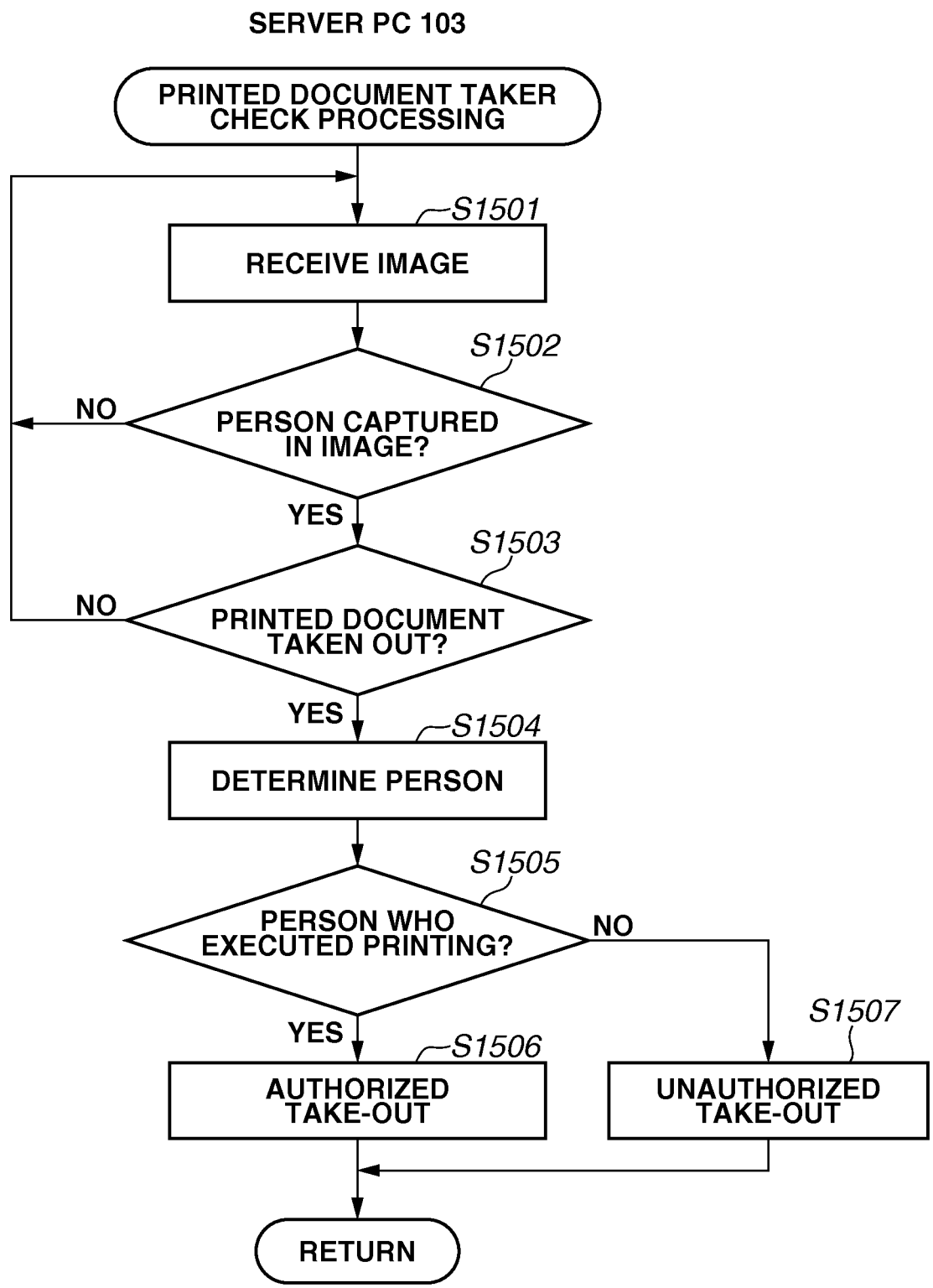

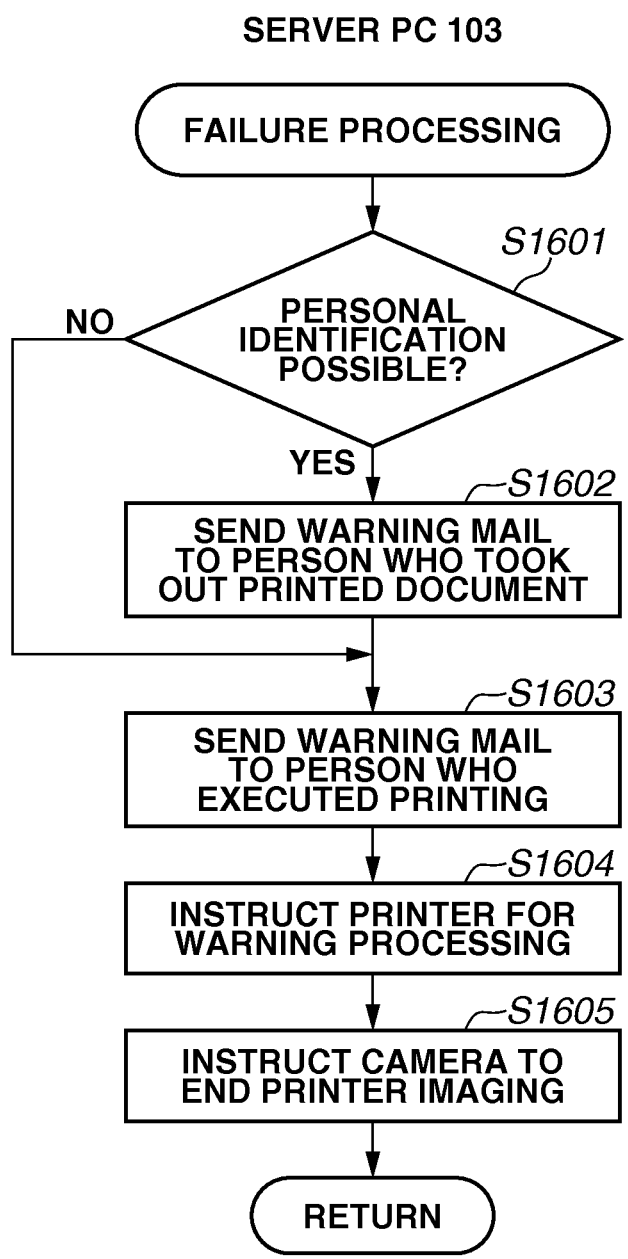

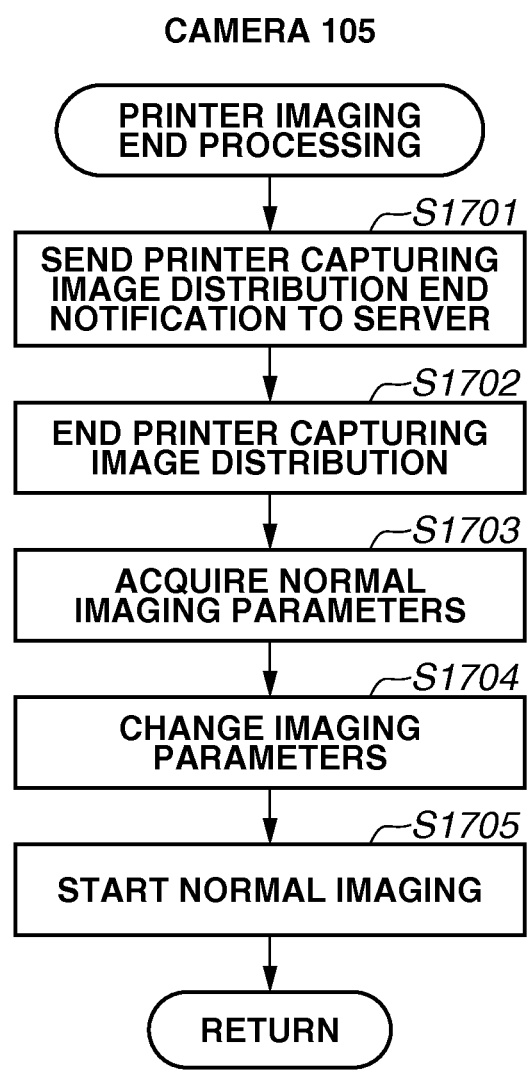

SERVER APPARATUS, METHOD FOR CONTROLLING SERVER APPARATUS, AND STORAGE MEDIUM

BACKGROUND OF THE INVENTION

Field of the Invention

The present invention relates to a server apparatus, a method for controlling the server apparatus, and a storage medium.

Description of the Related Art

In printing in an office, it is common to install a shared printer, give a printing instruction to the shared printer, and go to the shared printer to take out a printed document. A final printed document can be acquired in this way.

In such a case of a system using a shared printer, the shared printer may be installed in a place away from the seat of a user. Therefore, the user cannot check a print status from the user's seat in many cases. In particular, when performing large-volume printing or time-consuming printing in which it is difficult to predict when the printing will end, the user often waits in front of the printer until the printing ends.

Meanwhile, Japanese Patent Application Laid-Open No. 2008-197152 discusses a system for monitoring a printer currently performing print processing by using a camera. A technique discussed in Japanese Patent Application Laid-Open No. 2008-197152 utilizes a job start notification, a job end notification, and a discharging unit sheet removal notification from the printer. Then, an image captured and recorded by a camera during a time period since the printer starts printing until a user takes out an output document, and manages the image in association with an output job.

In the technique discussed in Japanese Patent Application Laid-Open No. 2008-197152, it is managed whether the document output from the printer is taken away by a user who performed an output operation or taken away by an outside person. Therefore, the camera captures and records an image during a time period since the printer starts printing until the user takes out an output document, and stores the image in association with a job. However, since the system is not configured to distribute the image to the person who performed printing, the user who entered a job in the printer cannot confirm whether printing is completed.

SUMMARY OF THE INVENTION

The present invention is directed to a method for distributing, by using a camera capable of capturing an image of a printing apparatus identified by a received job, an image captured during a time period since printing is started until the printing is completed to an information processing apparatus that has received the relevant job.

A server apparatus according to the present invention for achieving the above-described purpose is provided with the following configuration.

According to an aspect of the present invention, a server apparatus configured to receive a job from an information processing apparatus and generate print data to be printed by a printing apparatus, includes a search unit configured to, in response to reception of the job, search for a camera configured to image a printing apparatus identified by the job, a reception unit configured to receive from the camera searched by the search unit an image of the printing apparatus captured by the camera, and a distribution unit configured to distribute the image received by the reception unit to an information processing apparatus identified by the job.

Further features of the present invention will become apparent from the following description of exemplary embodiments with reference to the attached drawings.

BRIEF DESCRIPTION OF THE DRAWINGS

FIG. 5 illustrates an example of a printer management table managed by a server PC.

FIG. 6 illustrates an example of a camera management table managed by the server PC.

FIG. 7 illustrates an example of a printer-camera correspondence table.

FIG. 8 illustrates an example of a user information table.

FIG. 10 is a flowchart illustrating a method for controlling an information processing apparatus.

FIG. 14 is a flowchart illustrating a method for controlling the server apparatus.

FIG. 15 is a flowchart illustrating a method for controlling the server apparatus.

FIG. 16 is a flowchart illustrating a method for controlling the server apparatus.

FIG. 17 is a flowchart illustrating a method for controlling the camera apparatus.

DESCRIPTION OF THE EMBODIMENTS

An exemplary embodiment of the present invention will be described below with reference to the accompanying drawings.

<Descriptions of System Configuration>

Figure 1:
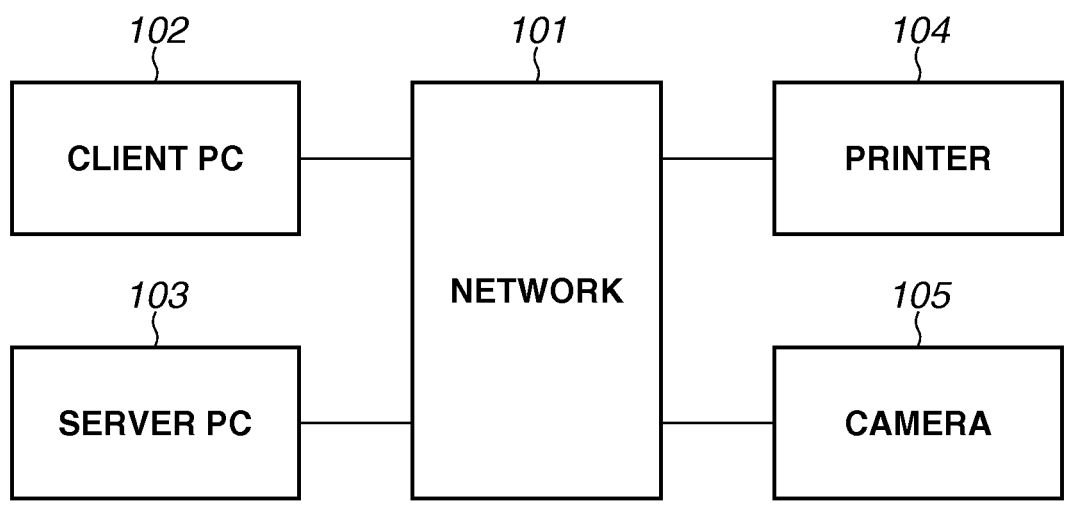
FIG. 1 illustrates a configuration of a printing system.

FIG. 1 illustrates a configuration of a printing system including an information processing apparatus according to a first exemplary embodiment.

Referring to FIG. 1, a predetermined operating system (OS) and device drivers are installed in a client personal computer (PC) 102. A user performs file printing on a printer 104 from the client PC 102 via a server PC 103. The user further displays an image captured by a camera 105 on the client PC 102 via the server PC 103. The client PC 102 may be a tablet terminal or a smart phone as long as it can perform printing and image display.

The server PC 103 performs processing for receiving print data from the client PC 102 and printing the print data on the printer 104, and processing for receiving an image captured by the camera 105 and distributing the image to the client PC 102. The server PC 103 further manages a plurality of printers and a plurality of cameras in addition to the illustrated ones, and assigns to each printer a camera capable of imaging each printer (pairing). Thus, the plurality of printers can be monitored by the plurality of cameras, respectively. In pairing, a plurality of cameras may be assigned to one printer. Even if a specific camera fails, this configuration enables reducing influences of the failure on the system.

The printer 104 may be provided with a number of functions, such as a print function, a copy function, and a facsimile function. In the present exemplary embodiment, at least the print function is required. The printer 104 according to the present exemplary embodiment receives print data from the server PC 103 and performs print processing.

The camera 105 is connected to a network 101 to function as a network camera. The camera 105, what is called a monitoring camera, images the vicinity of the printer 104. The camera 105 may be installed at any position where the printer 104 can be imaged.

The network 101 is, for example, Ethernet (registered trademark). All of the above-described apparatuses are connected to the network 101. The present invention is also applicable to a system in which a client PC 1012 is connectable to a wireless router connected to the network 101. Each of the apparatuses illustrated in FIG. 1 includes hardware components, such as a central processing unit (CPU), a random access memory (RAM), a read only memory (ROM), a hard disk drive (HDD), and a network interface card.

Figure 2:
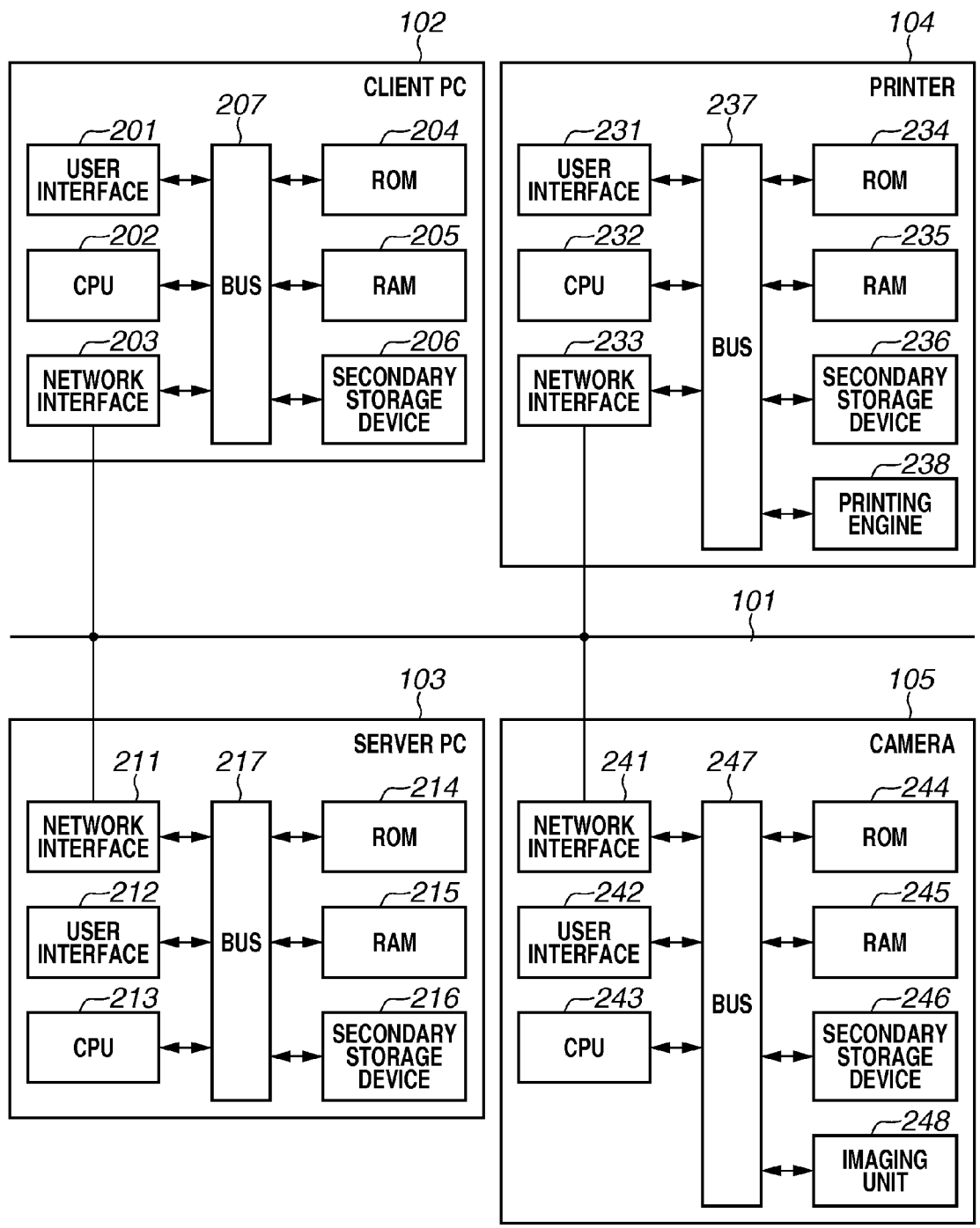
FIG. 2 illustrates hardware configurations of information processing functions of the printing system.

FIG. 2 illustrates hardware configurations of information processing functions of the client PC 102, the server PC 103, the printer 104, and the camera 105 illustrated in FIG. 1.

Each hardware component of the client PC 102 illustrated in FIG. 2 will be described. A user interface 201 inputs and outputs information via a display, a keyboard, a mouse, and a touch panel. A network interface 203 connects the client PC 102 to the network 101, such as a local area network (LAN), to perform communication with other computers and network devices.

A ROM 204 stores built-in programs and data. A RAM 205 is a temporary memory area. A secondary storage device 206 is typified by a HDD. A CPU 202 reads a program from the ROM 204, the RAM 205, or the secondary storage device 206, and executes the program. Each unit is connected via a bus 207.

Each hardware component of the server PC 103 illustrated in FIG. 2 will be described. A user interface 212 inputs and outputs information via a display, a keyboard, a mouse, and a touch panel. A network interface 211 connects the server PC 103 to a network, such as a LAN, to perform communication with other computers and network devices. A ROM 214 stores built-in programs and data.

A RAM 215 is a temporary memory area. A secondary storage device 216 is typified by a HDD. A CPU 213 reads a program from the ROM 214, the RAM 215, or the secondary storage device 216, and executes the program. Each unit is connected via a bus 217.

Each hardware component of the printer 104 illustrated in FIG. 2 will be described below. A user interface 231 inputs and outputs information via a display, a keyboard, and a touch panel. A network interface 233 connects the printer 104 to the network 101, such as a LAN, to perform communication with other computers and network devices.

A ROM 234 stores built-in programs and data. A RAM 235 is a temporary memory area. A secondary storage device 236 is typified by a HDD. A CPU 232 reads a program from the ROM 234, the RAM 235, or the secondary storage device 236, and executes the program. A print engine 238 prints data on paper (sheets). Each unit is connected via a bus 237.

Each hardware component of the camera 105 illustrated in FIG. 2 will be described. A user interface 242 can be connected and operated from other computers via a remote shell. A network interface 241 connects the camera 105 to a network, such as a LAN, to perform communication with other computers and network devices. A ROM 244 stores built-in programs and data. A RAM 245 is a temporary memory area.

A secondary storage device 246 is typified by a HDD. A CPU 243 reads a program from the ROM 244, the RAM 245, or the secondary storage device 246, and executes the program. An imaging unit 248 including a charge coupled device (CCD) sensor captures an image of a predetermined space, and stores the image in the secondary storage device 246. Each unit is connected via a bus 247.

Figure 3:
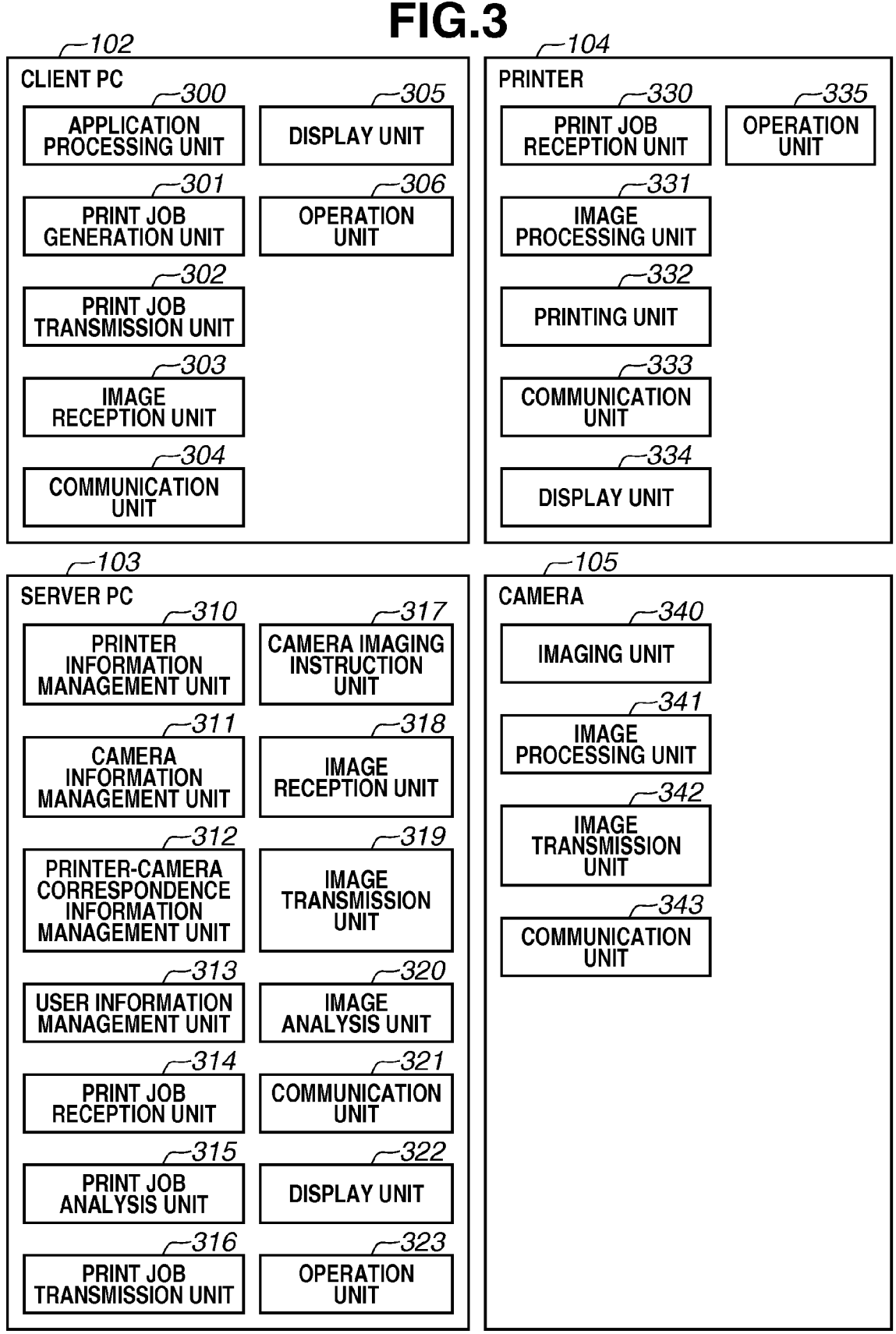
FIG. 3 illustrates software configurations of the printing system.

FIG. 3 illustrates software configurations of the client PC 102, the server PC 103, the printer 104, and the camera 105 illustrated in FIG. 1. The following modules (programs) operate on the respective CPUs.

Each module of the client PC 102 illustrated in FIG. 3 will be described. An application processing unit 300 includes a plurality of application software programs installed in the client PC 102. The user executes desired print processing from the application software via an operation unit 306.

When the user executes print processing, each module performs processing as follows. A print job generation unit 301 generates a print job. A communication unit 304 transmits the print job to the printer 104 via a print job transmission unit 302. An image reception unit 303 receives an image of the printer 104 captured by the camera 105 transmitted from the server PC 103. A display unit 305 display the image.

Each module of the server PC 103 illustrated in FIG. 3 will be described. A printer information management unit 310 manages the printer 104 for performing print processing. A camera information management unit 311 manages the camera 105 for monitoring the printer 104. A printer-camera correspondence information management unit 312 manages camera information to be used for printer monitoring and parameter information to be used for printer imaging.

A user information management unit 313 manages information for each user. A print job reception unit 314 receives a print job from the client PC 102. A print job analysis unit 315 analyzes the print job. A print job transmission unit 316 transmits a print job to the printer 104 to instruct the printer 104 to perform printing.

A camera imaging instruction unit 317 instructs the camera 105 to capture an image of the printer 104. An image reception unit 318 receives a captured image from the camera 105. An image transmission unit 319 transmits the received captured image to the client PC 102.

An image analysis unit 320 performs image analysis on the captured image received from the camera 105 to detect take-out of a printed document to determine a person who took out the printed document. A communication unit 321 transmits a print job to the printer 104, and performs communication processing for receiving and transmitting a captured image. A display unit 322 displays processing during various operations of the server PC 103. An operation unit 323 controls operations on the server PC 103.

Each module of the printer 104 illustrated in FIG. 3 will be described. A print job reception unit 330 receives a print job transmitted from the server PC 103 via the communication unit 333. An image processing unit 331 analyzes the print job and converts the print job into print image data. A printing unit 332 performs print output. A display unit 334 displays a printer status. An operation unit 335 controls operations to the printer 104.

Each module of the camera 105 illustrated in FIG. 3 will be described. An imaging unit 340 performs camera imaging processing. An image processing unit 341 performs image processing on a captured image. A image transmission unit 342 transmits the image to the server PC 103 via a communication unit 343.

Figure 4:
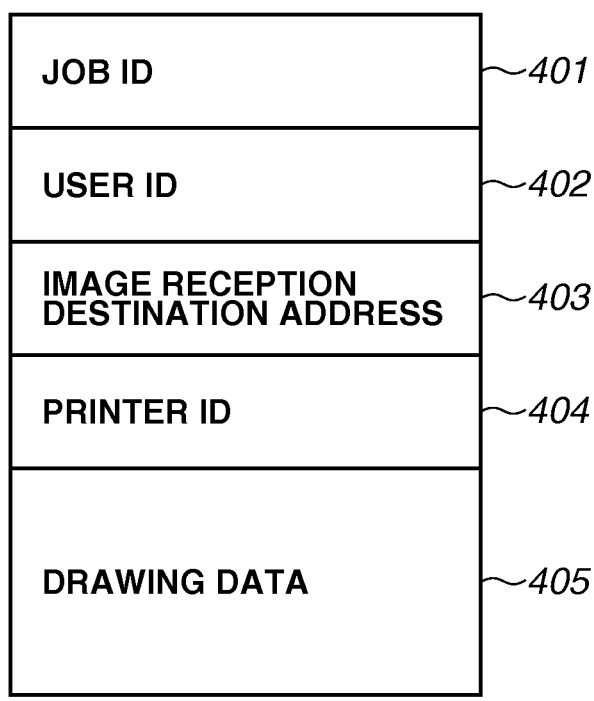
FIG. 4 illustrates an example of print data generated by a client personal computer (PC).

FIG. 4 illustrates an example of print data generated by the client PC 102 illustrated in FIG. 1.

Referring to FIG. 4, the print data generated by the print job generation unit 301 of the client PC 102 includes drawing data 405, a job ID 401 for identifying a print job, and a user ID 402 for identifying a user who performed printing. The print data further includes an image reception destination address 403 as information for identifying an apparatus that receives an image, and a printer ID 404 for identifying a printer for performing print output.

FIG. 5 illustrates an example of a printer management table managed by the server PC 103 illustrated in FIG. 1.

Referring to FIG. 5, the printer management table stores information about all of printers managed by the server PC 103. The printer management table stores a printer ID 501 for identifying a printer, a printer name 502 describing the name of the printer corresponding to the printer ID 501, and an Internet Protocol (IP) address 503 of the printer having the printer ID 501. These pieces of information are preset when each printer is installed.

FIG. 6 illustrates an example of a camera management table managed by the server PC 103 illustrated in FIG. 1.

Referring to FIG. 6, the camera management table stores information about all of cameras managed by the server PC 103. The camera management table stores a camera ID 601 for identifying a camera, a camera name 602 describing the name of the camera corresponding to the camera ID 601, and an IP address 603 of the camera having the camera ID 601.

The camera management table further stores values of a Pan 604, a Tilt 605, and a Zoom 606 as camera imaging parameter information to be used for normal imaging. The Pan 604 indicates the horizontal angle of the camera 105. The Tilt 605 indicates the vertical angle of the camera 105. The Zoom 606 indicates the magnification of the camera 105. Although these pieces of information are preset when each camera is installed, it is also possible to change settings as required, in response to a change in the installation position of the printer 104, a replacement of the printer 104, or a change of a room in which the printer 104 is installed.

FIG. 7 illustrates an example of a printer-camera correspondence table for the printer 104 and the camera 105 illustrated in FIG. 1.

Referring to FIG. 7, the printer-camera correspondence table stores camera information for monitoring all of printers managed by the server PC 103. For a printer ID 701, the printer-camera correspondence table stores a corresponding camera ID 702 and camera imaging parameter information, i.e., the values of a Pan 703, a Tilt 704, and a Zoom 705 to be used for printer monitoring. Although these pieces of information are preset when each printer and each camera are installed, it is also possible to change settings as required in response to a change in the installation position of the printer 104, a replacement of the printer 104, or a change of a room in which the printer 104 and the camera 105 are installed.

FIG. 8 illustrates an example of a user information table managed by the server PC 103 illustrated in FIG. 1.

Referring to FIG. 8, the user information table stores information about all of users who use printers managed by the server PC 103. The user information table includes a user ID 801 for identifying a user, a user name 802 describing the name of the user corresponding to the user ID 801, feature data 803 which is feature information for identifying the user having the user ID 801, and a mail address 804 of the user having the user ID 801. These pieces of information are preset when each user is registered.

Figure 9:
FIG. 9 (consisting of FIGS. 9A and 9B) is a flowchart illustrating a method for controlling the printing system.
Figure 9A:
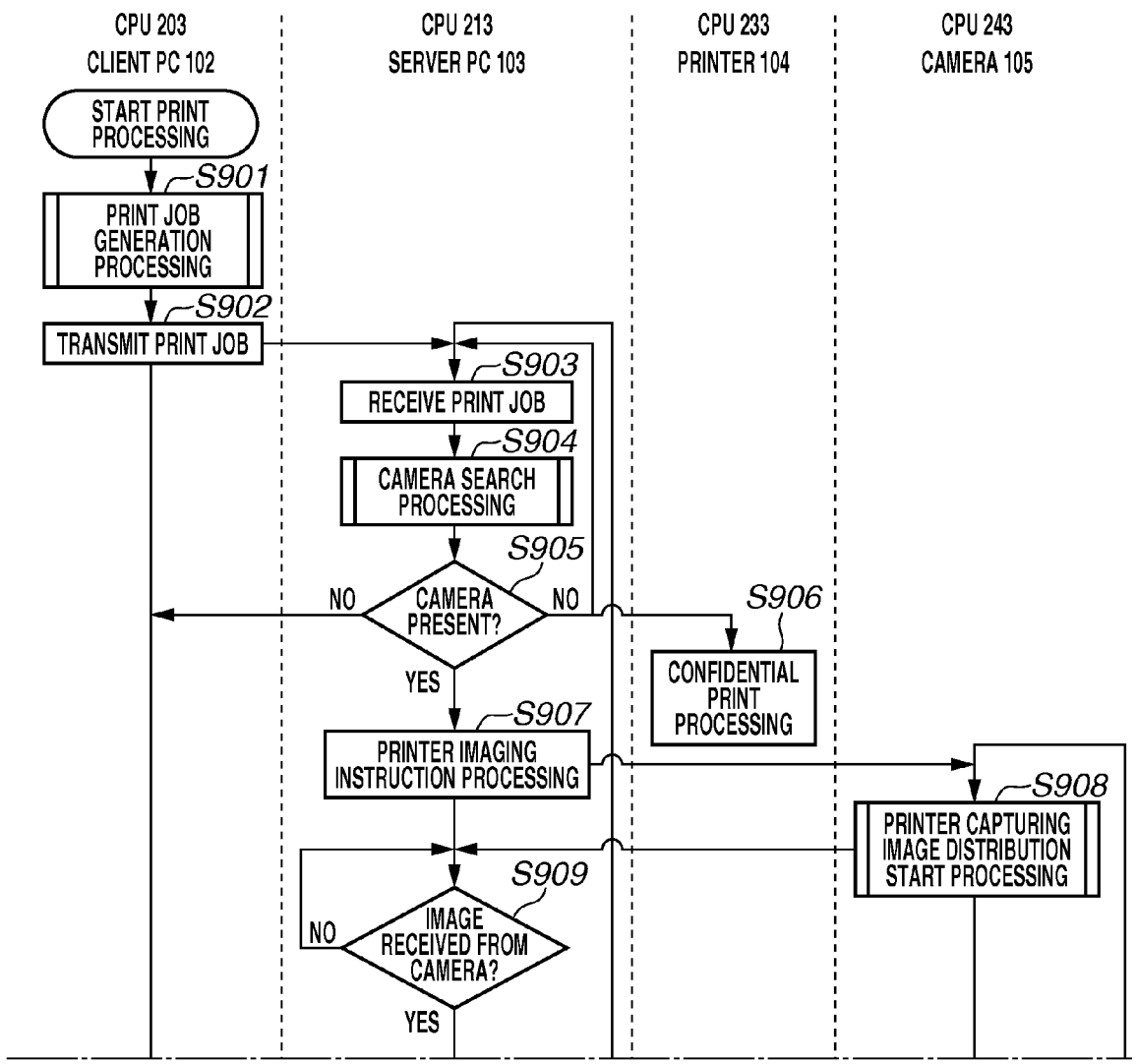
Figure 9B:
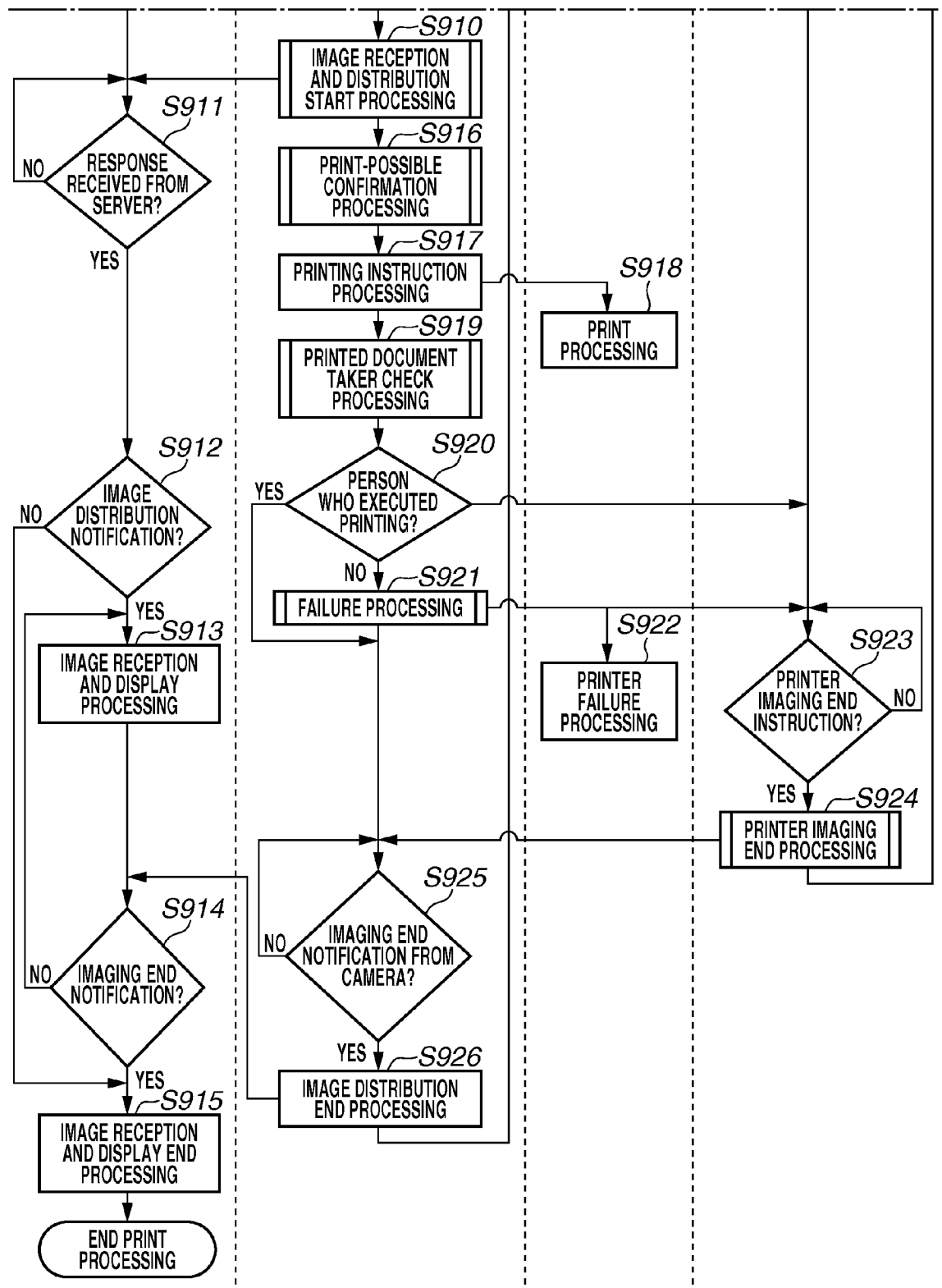

FIG. 9 (consisting of FIGS. 9A and 9B) is a flowchart illustrating a data processing method used in a printing system according to the present exemplary embodiment. This example is an example of data processing performed in print processing. When activation processing for the client PC 102, the server PC 103, the printer 104, and the camera 105 is executed, these apparatuses perform respective initialization processing to achieve a state where various processing becomes ready for execution.

For example, the client PC 102 generates print data upon reception of a print processing instruction from the user, or enters a state where other processing becomes ready for execution. The server PC 103 enters a state where processing from a server administrator via the operation unit 323 or processing based on data input from the client PC 102, the printer 104, and the camera 105 becomes ready for execution. The printer 104 enters an instruction wait state where processing based on a printing instruction or other instructions from the server PC 103 is ready for execution. The camera 105 enters a normal camera imaging state where the camera 105 is able to image the printer 104 upon reception of an instruction from the server PC 103. Each step is implemented when the CPU 202, the CPU 213, the CPU 232, and the CPU 243 included in the client PC 102, the server PC 103, the printer 104, and the camera 105, respectively, execute a stored control program.

When the client PC 102 performs print processing, the following processing sequence is performed. In step S901, the print job generation unit 301 of the client PC 102 performs print job generation processing (described below referring to FIG. 10) to generate a print job. In step S902, the print job transmission unit 302 of the client PC 102 transmits the print job generated in step S901 to the server PC 103. Then, the processing proceeds to step S911.

Meanwhile, after the client PC 102 transmits the print job, then in step S903, the print job reception unit 314 of the server PC 103 receives the print job from the client PC 102. In step S904, the CPU 213 of the server PC 103 executes camera search processing (described below referring to FIG. 11).

In step S905, the CPU 213 checks a result of the camera search processing. When the CPU 213 determines that a relevant camera is present (YES in step S905), the processing proceeds to step S907.

On the other hand, when the CPU 213 determines that there is no relevant camera (NO in step S905), the CPU 213 sends a response for confidential print processing to the printer 104, and sends a response indicating that imaging is impossible to the client PC 102. Then, the processing returns to step S903.

Further, when the CPU 213 determines that there is no relevant camera (NO in step S905), the CPU 232 of the printer 104 receive a confidential printing instruction from the server PC 103. Then, in step S906, the CPU 232 executes confidential print processing. In confidential printing, the printer 104 stores (reserves) print data, and, upon reception of a printing instruction from an authenticated user via the operation unit 335 of the printer 104, for example, performs print output. A printed document can be taken out only by a person who executed printing.

Meanwhile, in step S907, the CPU 213 acquires the IP address 603, the values of the Pan 703, the Tilt 704, and the Zoom 705 corresponding to the camera ID acquired in step S904 from the camera management table illustrated in FIG. 6 and the printer-camera correspondence tale illustrated in FIG. 7. Then, the CPU 213 instructs the camera 105 having the acquired IP address to image the printer 104 based on the values of the Pan 703, the Tilt 704, and the Zoom 705 as imaging conditions. Upon reception of the printer imaging instruction, then in step S908, the camera 105 performs printer capturing image distribution start processing (described below referring to FIG. 12), changes the imaging mode to a printer imaging state from the normal imaging state, and performs printer imaging and image distribution until the camera 105 detects a printer imaging end instruction in the following step S923.

Following the processing in step S907 by the server PC 103, in step S909, the CPU 213 determines whether an image has been distributed from the camera 105 that has been instructed to image the printer in step S907. When the CPU 213 determines that no image has been distributed (NO in step S909), the CPU 213 repeats step S909 until an image is determined to have been distributed.

When the CPU 213 determines that an image has been distributed (YES in step S909), then in step S910, the CPU 213 executes image reception and distribution start processing (described below referring to FIG. 13).

In the image reception and distribution start processing, the CPU 213 starts image distribution to the client PC 102 specified as an image distribution destination. After transmission of a print job in step S902, in step S911, the CPU 202 of the client PC 102 determines whether a response has been received from the server PC 103. When the CPU 202 determines that no response has been received (NO in step S911), the CPU 202 repeats step S911 until a response is determined to have been received. Responses from the server PC 103 include an imaging impossible response and an image distribution notification.

When the CPU 202 determines that a response has been received from the server PC 103 (YES in step S911), then in step S912, the CPU 202 determines whether the response is an image distribution notification. When the CPU 202 determines that the response is an image distribution notification (YES in step S912), the processing proceeds to step S913. On the other hand, when the CPU 202 determines that the response is not an image distribution notification (NO in step S912), then in step S915, the CPU 202 executes image reception and display end processing. Then, the print processing is ended.

In step S913, the CPU 202 receives an image distributed from the server PC 103, and displays the image of the printer 104 on the display unit 305. In step S914, the CPU 202 determines whether an image distribution end notification has been received from the server PC 103. When the CPU 202 determines that the image distribution end notification has not been received (NO in step S914), the processing returns to step S913. On the other hand, when the CPU 202 determines that the image distribution end notification has been received (YES in step S914), then in step S915, the CPU 202 ends image reception and display processing on the display unit 305. Then, the print processing is ended.

After the server PC 103 starts image distribution to the client PC 102 in step S910, in step S916, the CPU 213 executes print-possible confirmation processing (described below referring to FIG. 14). In step S917, the CPU 213 executes processing for instructing the printer 104 to perform printing.

In step S918, upon receiving a printing instruction from the server PC 103, the CPU 232 of the printer 104 executes print processing. Unlike the above-described confidential printing, in this print processing, upon receiving print data, the printer 104 starts the print output at the same time. Therefore, during execution of print output, a printed document may be possibly taken out by a person other than the person who executed printing.

In step S917, the CPU 213 instructs the printer 104 to perform printing. In step S919, the CPU 213 executes printed document taker check processing (described below referring to FIG. 15).

In step S920, the CPU 213 determines the result of the printed document taker check processing. When the CPU 213 determines that the document taker is a person who has executed printing (YES in step S920), the CPU 213 instructs the camera 105 that has been instructed to image the printer 104 in step S907 to end printer imaging. Then, the processing proceeds to step S925.

When the CPU 243 of the camera 105 continuing printer imaging and image distribution receives a printer imaging end instruction from the server PC 103 (YES in step S923), then in step S924, the CPU 243 executes printer imaging end processing (described below referring to FIG. 17) and enters the normal camera imaging state. Then, the processing returns to step S908. In step S924, the CPU 243 sends a printer imaging end notification to the server PC 103.

On the other hand, when the CPU 213 of the server PC 103 determines that the document taker is not a person who has executed printing (NO in step S920), then in step S921, the CPU 213 executes failure processing (described below referring to FIG. 16). In this failure processing, when a warning display instruction to the display unit 334 is sent to the printer 104, then in step S922, the CPU 232 of the printer 104 displays on the display unit 334 a message indicating that the printed document has been taken out by a person other than the person who executed printing. Further, in this failure processing, the CPU 213 instructs the camera 105 to end printer imaging. Then, in step S923, the CPU 243 of the camera 105 detects a printer imaging end instruction.

Following the processing in step S921, in step S925, the CPU 213 of the server PC 103 determines whether the printer imaging end notification has been received from the camera 105. When the CPU 213 determines that the printer imaging end notification has not been received (NO in step S925), the CPU 213 repeats the determination in step S925.

On the other hand, when the CPU 213 determines that the printer imaging end notification has been received (YES in step S925), then in step S926, the CPU 213 sends the image distribution end notification to the client PC 102. Then, the processing returns to step S903.

[Print Job Generation Processing by Client PC 102]

FIG. 10 is a flowchart illustrating a data processing method for the information processing apparatus according to the present exemplary embodiment. This is an example of print job generation processing performed by the client PC 102, and corresponds to the detailed procedure in step S901 illustrated in FIG. 9. Each step is implemented when the CPU 202 executes a stored control program. The following descriptions are made based on the modules illustrated in FIG. 3 executed by the CPU 202.

The print job generation processing will be described. In step S1001, the application processing unit 300 acquires a print setting specified by the user via the operation unit 306 on application software. In step S1002, the print job generation unit 301 generates print data corresponding to the target printer based on the print setting.

In step S1003, the print job generation unit 301 generates a job ID for identifying a print job, and adds the job ID to the print data. In step S1004, the print job generation unit 301 adds a user ID, i.e., information specific to a person who has executed printing, to the print data. In step S1005, the print job generation unit 301 adds the IP address of the client PC 102 to the print data as an image reception destination address for performing the print job generation processing as a terminal for receiving a camera image. In step S1006, the print job generation unit 301 adds a printer ID of the target printer for printing to the print data. Then, the processing returns to the caller.

[Camera Search Processing by Server PC 103]

Figure 11:
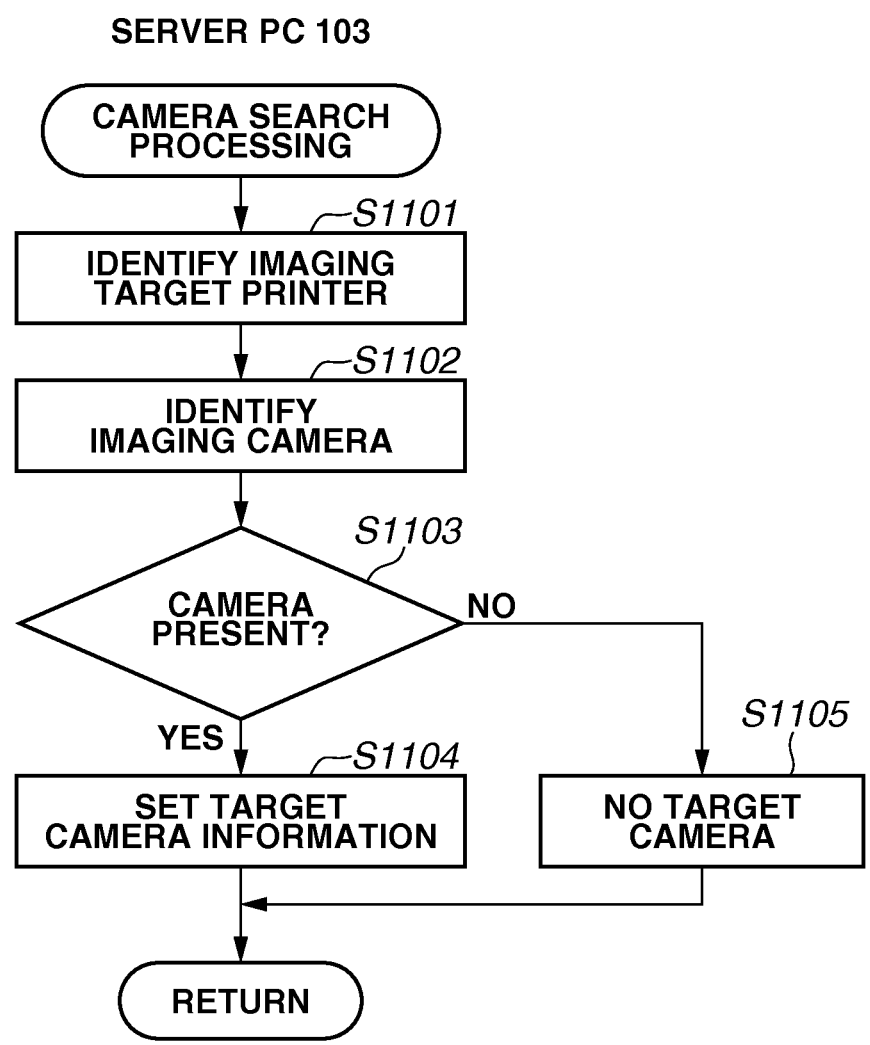
FIG. 11 is a flowchart illustrating a method for controlling a server apparatus.

FIG. 11 is a flowchart illustrating a method for controlling the server apparatus according to the present exemplary embodiment. This is an example of camera search processing performed by the server PC 103, and corresponds to the detailed procedure in step S904 illustrated in FIG. 9. Each step is implemented when the CPU 213 executes a stored control program. The following descriptions are made based on the modules illustrated in FIG. 3 executed by the CPU 213.

In step S1101, the print job analysis unit 315 acquires a printer ID from the print job received by the print job reception unit 314 from the client PC 102, and identifies the imaging target printer. In step S1102, the printer-camera correspondence information management unit 312 searches for a printer ID which coincides with the printer ID 701 of the imaging target printer in the printer-camera correspondence table illustrated in FIG. 7. When such a printer ID is found, the printer-camera correspondence information management unit 312 acquires a camera ID corresponding to the printer ID.

In step S1103, the printer-camera correspondence information management unit 312 determines whether the camera ID can be acquired to determine whether there is a camera that can image the target printer. When the printer-camera correspondence information management unit 312 determines that the camera ID can be acquired (YES in step S1103), then in step S1104, the camera imaging instruction unit 317 sets the camera ID as camera information. Then, the processing returns to the caller.

On the other hand, when the printer-camera correspondence information management unit 312 determines that the camera ID cannot be acquired (NO in step S1103), then in step S1105, the camera imaging instruction unit 317 sets "No Camera" as camera information. Then, the processing returns to the caller.

[Printer Capturing Image Distribution Start Processing by Camera]

Figure 12:
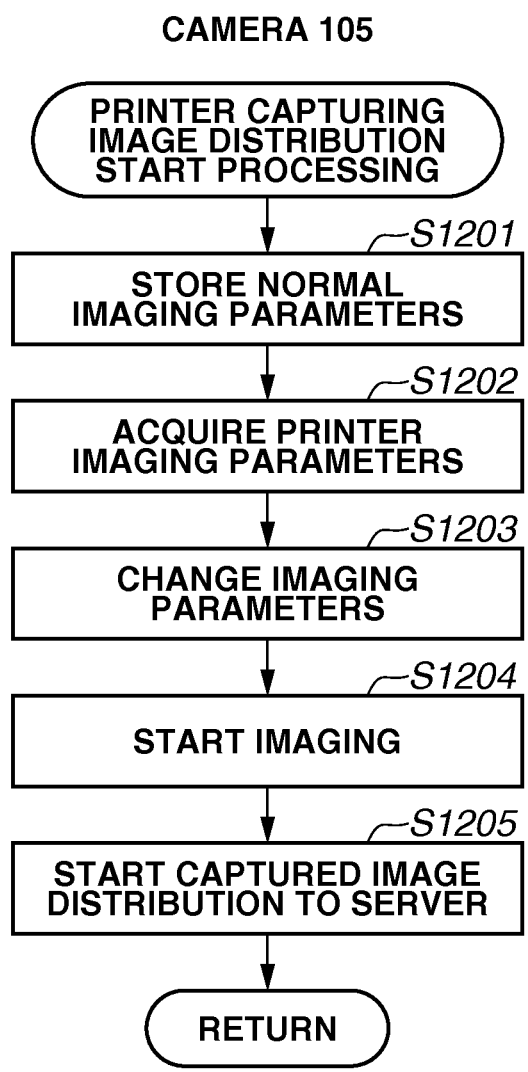
FIG. 12 is a flowchart illustrating a method for controlling a camera apparatus.

FIG. 12 is a flowchart illustrating a method for controlling the camera apparatus according to the present exemplary embodiment. This is an example of printer capturing image distribution start processing, and corresponds to the detailed procedure in step S908 illustrated in FIG. 9. Each step is implemented when the CPU 243 executes a stored control program. The following descriptions are made based on the modules illustrated in FIG. 3 executed by the CPU 243.

In step S1201, the image processing unit 341 stores the current imaging parameters. In step S1202, the image processing unit 341 acquires imaging parameters for imaging the imaging target printer. In step S1203, the image processing unit 341 changes imaging parameters for the imaging unit 340 of the camera 105. Thus, the optimal settings for imaging a target printer are achieved. In step S1204, the imaging unit 340 starts imaging based on the changed imaging parameters. In step S1205, the image transmission unit 342 starts distributing a captured image to the server PC 103. Then, the processing returns to the caller.

[Image Reception and Distribution Start Processing by Server PC]

Figure 13:
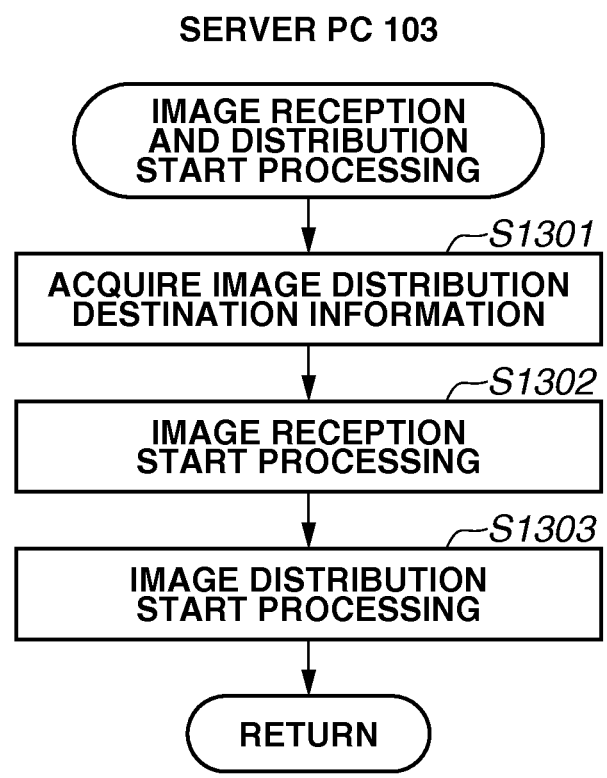
FIG. 13 is a flowchart illustrating a method for controlling the server apparatus.

FIG. 13 is a flowchart illustrating a method for controlling the server apparatus according to the present exemplary embodiment. This is an example of image reception and distribution start processing performed by the server PC 103, and corresponds to the detailed procedure in step S910 illustrated in FIG. 9. Each step is implemented when the CPU 213 executes a stored control program. The following descriptions are made based on the modules illustrated in FIG. 3 executed by the CPU 213.

In step S1301, the image reception unit 318 acquires information about the image distribution destination. In step S1302, the image reception unit 318 starts receiving a image distributed from the camera 105. In step S1303, the image transmission unit 319 starts distributing the received image to the image distribution destination. Then, the processing returns to the caller.

[Print-Possible Confirmation Processing by Server PC]

FIG. 14 is a flowchart illustrating a method for controlling the server apparatus according to the present exemplary embodiment. This is an example of print-possible confirmation processing performed by the server PC 103, and corresponds to the detailed procedure in step S910 illustrated in FIG. 9. Each step is implemented when the CPU 213 executes a stored control program. The following descriptions are made based on the modules illustrated in FIG. 3 executed by the CPU 213.

In step S1401, the image reception unit 318 receives an image distributed from the camera 105. In step S1402, the image analysis unit 320 analyzes the received image to check whether a printed document is present in a sheet discharge tray of the printer 104. When the image analysis unit 320 determines that a printed document is present (YES in step S1403), the processing returns to step S1401. On the other hand, when the image analysis unit 320 determines that a printed document is not present (NO in step S1403), the processing proceeds to step S1404.

As an example method for determining whether a printed document remains on the sheet discharge tray of the printer 104, an image of the sheet discharge tray of the printer 104 in a state where there is no printed document on the sheet discharge tray is stored in advance, and the image analysis unit 320 determines whether the image of the sheet discharge tray of the printer 104 when making the relevant determination coincides with the stored image.

In step S1404, the image reception unit 318 further receives an image distributed from the camera 105. In step S1405, the image analysis unit 320 performs image analysis to check whether there is a person in the vicinity of the printer 104. When the image analysis unit 320 determines that there is a person in the vicinity of the printer 104 (YES in step S1406), the processing returns to step S1404. On the other hand, when the image analysis unit 320 determines that there is no person in the vicinity of the printer 104 (NO in step S1406), the processing returns to the caller.

As an example method for determining whether there is a person in the vicinity of the printer 104, an image in a state where there is no person in the vicinity of the printer 104 is stored in advance, and the image analysis unit 320 determines whether the image of the vicinity of the printer 104 when making the relevant determination coincides with the stored image.

[Printed Document Taker Check Processing by Server PC]

FIG. 15 is a flowchart illustrating a method for controlling the server apparatus according to the present exemplary embodiment. This is an example of the printed document taker check processing by the server PC 103, and corresponds to the detailed procedure in step S919 illustrated in FIG. 9. Each step is implemented when the CPU 213 executes a stored control program. The following descriptions are based on the modules illustrated in FIG. 3 executed by the CPU 213.

In step S1501, the image reception unit 318 receives an image distributed from the camera 105. In step S1502, the image analysis unit 320 analyzes the image to determine whether there is a person in the vicinity of the printer 104. When the image analysis unit 320 determines that there is no person (NO in step S1502), the processing returns to step S1501. On the other hand, when the image analysis unit 320 determines that there is a person (YES in step S1502), the processing proceeds to step S1503.

In step S1503, the image analysis unit 320 determines whether the printed document has been taken out. When the image analysis unit 320 determines that the printed document has not been taken out (NO in step S1503), the processing returns to step S1501. On the other hand, when the image analysis unit 320 determines that the printed document has been taken out (YES in step S1503), then in step S1504, the image analysis unit 320 performs personal identification processing based on the acquired image.

As an example of the personal identification processing, the image analysis unit 320 generates feature data of the person based on the image, and searches for information of the feature data 803 in the user information table, which coincides with the generated feature data to identify the user ID of the person.

In step S1505, the image analysis unit 320 determines whether the user ID of the person who has taken out the printed document coincides with the user ID added to the print data (i.e., whether the user ID identified by a job is identical to the user ID of the person who has taken out the printed document). Through this processing, the image analysis unit 320 determines whether the person who has executed printing has taken out the printed document. When there is no user ID that coincides with the feature data of the person who has taken out the printed document, the image analysis unit 320 determines that an unknown person has taken out the printed document. When the image analysis unit 320 determines that the user ID of the relevant person coincides with the added user ID (YES in step S1505), then in step S1506, the image analysis unit 320 determines that the printed document has been taken out in an authorized way. Then, the processing returns to the caller. On the other hand, when the image analysis unit 320 determines that the user ID of the relevant person does not coincide with the added user ID (NO in step S1505), then in step S1507, the image analysis unit 320 determines that the printed document was taken out in an unauthorized way. Then, the processing returns to the caller.

[Failure Processing by Server PC]

FIG. 16 is a flowchart illustrating a method for controlling the server apparatus according to the present exemplary embodiment. This is an example of failure processing by the server PC 103, and corresponds to the detailed procedure in step S921 illustrated in FIG. 9. Each step is implemented when the CPU 213 executes a stored control program. The following descriptions are based on the modules illustrated in FIG. 3 executed by the CPU 213.

In step S1601, the image analysis unit 320 determines whether a person who took out the printed document can be identified. To make this determination, the image analysis unit 320 determines whether there is feature data that coincides with the feature data of the person who has taken out the printed document, referring to the user information table. When the image analysis unit 320 determines that personal identification is impossible (NO in step S1601), the processing proceeds to step S1603.

On the other hand, when the image analysis unit 320 determines that personal identification is possible (YES in step S1601), then in step S1602, the user information management unit 313 extracts a mail address 804 of a person corresponding to the matched feature data in the user information table, and the communication unit 323 issues a mail for warning unauthorized take-out to the relevant mail address.

In step S1603, referring to the user information table, the user information management unit 313 extracts the mail address 804 from the user ID of the person who has executed printing, and the communication unit 321 issues a mail to the person who has executed printing for warning that the printed document has been taken out.

In step S1604, the communication unit 321 instructs the display unit 334 of the printer 104 which has performed printing to display a warning indicating that the printed document has been taken out in an unauthorized way. In step S1605, the camera imaging instruction unit 317 instructs the camera 105 currently imaging the printer 104 to end imaging. Then, the processing returns to the caller.

[Printer Imaging End Processing by Camera]

FIG. 17 is a flowchart illustrating a method for controlling the camera apparatus according to the present exemplary embodiment. This is an example of printer imaging end processing, and corresponds to the detailed procedure in step S924 illustrated in FIG. 9. Each step is implemented when the CPU 243 executes a stored control program. The following descriptions are made based on the modules illustrated in FIG. 3 executed by the CPU 243.

In step S1701, the image processing unit 341 sends a printer capturing image distribution end notification to the server PC 103 via the communication unit 343. In step S1702, the imaging unit 340 ends printer imaging and the processing of printer capturing image distribution to the server PC 103.

In step S1703, the image processing unit 341 acquires the above-described normal imaging parameters stored in step S1201. In step S1704, the image processing unit 341 changes imaging parameters for the imaging unit 340 to normal imaging parameters. In step S1705, the imaging unit 340 starts normal imaging. Then, the processing returns to the caller.

According to the present exemplary embodiment, it is possible to provide a printing system which allows a user to confirm the end of printing from the user's seat, by distributing an image captured during a time period since printing is started until a printed document is taken out, to a person who has performed printing.

Each process of the present invention can also be achieved by executing software (program) acquired via a network or various storage media on a processing apparatus (CPU or processor), such as a personal computer.

The present invention is not limited to the above-described exemplary embodiments, and can be modified in diverse ways (including organic combinations of these exemplary embodiments) without departing from the spirit and scope thereof. These modifications are not excluded from the scope of the present invention.

According to the present invention, it is possible to distribute, by using a camera that can image a printing apparatus identified by a received job, an image captured during a time period since printing is started until printing is completed, to an information processing apparatus which received the relevant job.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-022026 filed Feb. 7, 2014, which is hereby incorporated by reference herein in its entirety.

What is claimed is:

1. A server apparatus comprising:
    a memory storing instructions;
    a processor in communication with the memory and upon execution of the instructions, the processor is caused to control:
    a search unit configured to, in response to reception of a job, search for a camera configured to image a printing apparatus identified by the job;
    a reception unit configured to receive from the camera searched by the search unit an image of the printing apparatus captured by the camera; and
    a distribution unit configured to distribute the image received by the reception unit to an information processing apparatus identified by the job;
    a determination unit configured to analyze the image distributed from the camera to determine a take-out status of a printed document based on the job;
    a discrimination unit configured to, based on registered feature information, determine whether a first user who has taken out the printed document distributed from the camera is identical to a second user identified by the job; and
    and a first notification unit configured to, in a case where the first user is determined to be not identical to the second user identified by the job, notify the second user of unauthorized take-out of the printed document.

2. The server apparatus according to claim 1, further comprising:
    an identification unit configured to identify the first user based on the feature information of the first user distributed from the camera,
    wherein the first notification unit notifies the first user identified by the identification unit of erroneous take-out of the printed document.

3. The server apparatus according to claim 2, wherein the first notification unit notifies the first user or the second user by mail.

4. The server apparatus according to claim 1, further comprising:
    a second notification unit configured to, in a case the first user is determined to be not identical to the second user identified by the job, notify of a message to be displayed by the printing apparatus as a warning.

5. A server apparatus configured to receive a job from an information processing apparatus and generate print data to be printed by a printing apparatus, the server apparatus comprising:
    a memory storing instructions;
    a processor in communication with the memory and upon execution of the instructions, the processor is caused to control:
    a search unit configured to, in response to reception of the job, search for a camera configured to image a printing apparatus identified by the job;
    a reception unit configured to receive from the camera searched by the search unit an image of the printing apparatus captured by the camera; and
    a distribution unit configured to distribute the image received by the reception unit to an information processing apparatus identified by the job;
    a detection unit configured to detect a user who operates the printing apparatus based on the image distributed from the camera; and
    a control unit configured to, in a case where the detection unit detects the user who operates the printing apparatus, perform control not to transmit the print data generated from the job to the printing apparatus.

6. The server apparatus according to claim 5, wherein, in a case where the detection unit does not detect the user who operates the printing apparatus, the control unit performs control to transmit the print data generated from the job to the printing apparatus.

7. A method for controlling a server apparatus, the method comprising:
    searching for, in response to reception of a job, a camera configured to image a printing apparatus identified by the job;
    instructing the camera about imaging conditions for the printing apparatus to be imaged by the searched camera;
    receiving an image of the printing apparatus captured by the camera; and distributing the received image to an information processing apparatus identified by the job;
    analyzing the image distributed from the camera to determine a take-out status of a printed document based on the job;
    determining, based on registered feature information, whether a first user who has taken out the printed document distributed from the camera is identical to a second user identified by the job; and
    notifying the second user of unauthorized take-out of the printed document in a case where the first user is determined to be not identical to the second user identified by the job.

8. A non-transitory computer-readable storage medium storing a program for causing a computer to function as each of the units according to claim 1.

9. A method for controlling a server apparatus configured to receive a job from an information processing apparatus and generate print data to be printed by a printing apparatus, the method comprising:

searching for, in response to reception of the job, a camera configured to image a printing apparatus identified by the job;

instructing the camera about imaging conditions for the printing apparatus to be imaged by the searched camera;

receiving an image of the printing apparatus captured by the camera; and and distributing the received image to an information processing apparatus identified by the job;

detecting a user who operates the printing apparatus based on the image distributed from the camera; and in a case where the detection unit detects the user who operates the printing apparatus, performing a control not to transmit the print data generated from the job to the printing apparatus.

* * * * *